_United States Patent_ [19] [11] Patent Number: 4,593,554
Aarts [45] Date of Patent: Jun. 10, 1986

[54] LEAK DETECTION
[75] Inventor: Mathias L. C. Aarts, Bilthoven, Netherlands
[73] Assignee: Product Suppliers AG, Switzerland
[21] Appl. No.: 698,040
[22] Filed: Feb. 4, 1985
[30] Foreign Application Priority Data
Feb. 8, 1984 [NL] Netherlands .......... 8400398
[51] Int. Cl.[4] ............................................ G01M 3/34
[52] U.S. Cl. ...................... 73/49.3; 73/45.4
[58] Field of Search ...................... 73/49.3, 49.2, 40.7, 73/52, 45.4

[56] References Cited
U.S. PATENT DOCUMENTS 3,027,753  4/1962  Harder, Jr. .......... 73/49.3 X
3,504,528  4/1970  Weinberg et al. ......... 73/49.3
3,813,923  6/1974  Pendleton .............. 73/49.2
4,055,984  11/1977 Marx .................... 73/40.7

FOREIGN PATENT DOCUMENTS 1209569  9/1959  France .................. 73/49.3
4711470  3/1967  Japan ................... 73/49.3

Primary Examiner—Stewart J. Levy
Assistant Examiner—Joseph W. Roskos
Attorney, Agent, or Firm—Scully, Scott, Murphy & Presser

[57] ABSTRACT

A method and an apparatus for detecting a possible leak in a vacuum package, in which the vacuum package is received within a wrapping wall at least essentially consisting of a gas-tight, flexible wrapping foil adapted for substantial adjustment to the contours of the vacuum package under the influence of overpressure, so that the vacuum package is tightly enveloped by the wrapping wall. Overpressure is applied to the wrapping foil such that this adjustment to the contours of the vacuum package is effected without sealing any leak present, ensuring that the pressure exteriorly of the vacuum package remains higher than the pressure within said vacuum package. Hermetic sealing from the outside air is effected in the residual space remaining between the vacuum package and the wrapping wall during a predetermined detection period, the pressure being gauged in function of the time.

16 Claims, 4 Drawing Figures

LEAK DETECTION

The packaging of all kinds of commercial goods, in particular foodstuffs, is often effected under vacuum, at least at a pressure lower than atmospheric pressure. Such a package will be referred to hereinafter as a "vacuum package". It is very important to detect immediately after the packaging whether the packages leak or not, for in the case of a leak, there may be ingress of oxygen, which is undesirable especially from the viewpoint of the organoleptic quality of the packed product.

An example wherein leak detection is of great importance is vacuum-packed ground or unground coffee beans. The normal method is for the packages originating from the packing machine to be stored for a given period of time, it being established thereafter whether they have become "soft". This happens by feeling the packages. The storage time depends on the size of the leak, the presence of which is to be detected, i.e. the storage time is longer as the presence of a smaller leak is to be detected.

Moreover, the storage time depends on the size of the package; the larger the package, the longer the storage time required. With 250 gram packages for instance, a frequently employed storage time is 36 hours (for larger packages this is longer). It has been found that such a "stand-over" time permits to detect 95% of the leaks. The non-detected ones concern leaks that are so small that after 36–48 hours, softening cannot be detected by "feeling". A norm has to be set to the percentage of the packages wherein a leak has been detected. This is e.g. 1 or 2%. If this norm is exceeded, sometimes the entire production of the last 36–48 hours has to be rejected. The packages have to be opened and their contents reintroduced in the production line. However, the major drawback is that it cannot be detected until after the full "stand-over time" that errors are present somewhere in the total production process. In that case it is extremely difficult to establish retrospectively the reason of the malfunction and to apply improvements, i.e. the "link" between the various phases of the production process and the eventual results, as manifested in the vacuum package, is lacking.

For the above reasons, it is highly important to have a detection method that renders the "stand-over" of the packages superfluous. Hitherto, this has not been successful, in spite of the prolonged existence of the problem and the concomitant difficulties.

It is an object of the present invention to provide a method and an apparatus enabling to shorten the detection time of leaks to only a few seconds. Only in that case is it possible to incorporate the testing as a part of a continuous production line.

U.S. Pat. Nos. 3,027,753 and 3,813,923 describe detection methods wherein a space is created around a container with packed material. In this space there is created a pressure that is lower than the pressure prevailing within the container. Gas flows from the container into this space. To prevent cracks in the container, it is supported by a tensioned diaphragm, which is kept clear of the container by means of ribs. The gas flowing from the container into the space created around it is detected somehow. French Pat. No. 1,209,569 also uses a rubber diaphragm. Here, too, a space remains between the wall of the container and the diaphragm. In case of a leak, gas will flow from the container into said space and the increase in pressure is measured again.

In German Auslegeschrift No. 1,271,423 a vacuum container is received in a rigid perforated enveloping space closely fitting around the vacuum package and this again in a second rigid enveloping space. The first space serves for imparting sufficient rigidity to a non-rigid package. The spaces are brought at a pressure that is lower than the pressure in the vacuum container. Here too, gas flows from the vacuum container into the space therearound and any increase in pressure is measured in the latter.

In U.S. Pat. No. 3,504,528 the container is introduced into a space having a pressure higher than the pressure in the container. The pressure reduction in this space is detected. Here too, there is no question of a diaphragm.

None of the above methods comes anywhere near to a detection speed of a few seconds with vacuum packages that "soften" after 36–48 hours only.

Using the principle of U.S. Pat. Nos. 3,027,753 and 3,813,923, wherein gas flows from the package to a space therearound, said space would have to be adjusted to a pressure that is still lower than that in the vacuum package. Except for the fact that the gauging of the pressure change at these low pressures is not very sensitive and the pressure changes only slowly at that, the expansion of the packet would adversely affect the pressure increase in the enveloping space to be gauged.

Similar objections hold with regard to German Auslegeschrift No. 1,271,423. True it is tried to reduce the drawback of expansion by introducing the package into a space having tight-fitting, perforated rigid walls, but it should be noted that vacuum packets in foil have a relatively high dimensional tolerance. This rigid space can therefore not, in fact, fit so tightly around the packet, while the other drawbacks mentioned above continue to exist unabated.

The drawback related to the tolerance of the packages also applies to U.S. Pat. No. 3,504,528. The tolerance in three dimensions of vacuum packages in foil such as vacuum-packed ground coffee, may be as high as 10%, so that the space within a rigid envelope around the package may constitute more than $\frac{1}{3}$ of the volume of the package. The sensitivity of the gauging is therefore too low in that case too.

The drawback of a high tolerance applies less to vacuum packages in tin, although allowance will have to be made for the projecting edge of tins. Here too, however, the gauging sensitivity still leaves much to be desired.

The teaching and the insight of Applicants underlying the present invention is that it is possible, under the influence of pressure and while maintaining a pressure outside the vacuum package exceeding that prevailing within said vacuum package, to cause a flexible foil to follow the contours of the vacuum package without sealing a leak present. This implies, on the one hand, that only a very small residual space remains between the vacuum packet and the foil, and on the other hand that free air displacement should remain possible in said residual space. Because of the reduced residual space, already a tiny quantity of air flowing through the leak from said residual space to the free space in the vacuum package will exert a great influence on the pressure in the residual space and be detected therefore within a short period of time.

According to the invention there is provided a method of detecting a leak in a vacuum package, which method is characterized by receiving the vacuum package in a wrapping wall, at least essentially consisting of a gastight, flexible wrapping foil, which under the influence of overpressure can substantially follow the contours of the vacuum package, so that the vacuum package is tightly enclosed by the wrapping wall, applying overpressure to the wrapping foil so that this adjustment to the contours of the vacuum package takes place without sealing of any leak present, ensuring that the pressure on the outside of the vacuum package remains higher than the pressure within said vacuum packet, and measuring the pressure in function of the time, while hermetically sealing the outside air from the residual space remaining between the vacuum package and the wrapping wall for a predetermined detection period.

The pressure causing the wrapping foil to follow the contours of the vacuum package can be obtained by causing a fluid—normally air—to act on the exterior of the wrapping foil. This is a preferred embodiment.

When the pressure on the wrapping foil is not increased excessively, surprisingly no sealing of a leak present occurs. The pressure to be applied therefor can be determined empirically. Without wishing to be committed to any particular explanation, we note that the wrinkled surface of many vacuum packages contributes to preventing the sealing of existing leaks. This wrinkled surface can be found, e.g. with granulated products, such as ground coffee or coffee beans, vacuum-packed in a gas-tight, flexible synthetic plastics foil (to which we will revert in the following). If the wrapping foil is rubber, also the fact that the surface thereof is normally not fully smooth could contribute thereto. In case the wrapping foil is flexible, but has nevertheless a certain rigidity, this too may contribute to preventing a sealing of leaks. This is the case e.g. with paper which—preferably on the exterior—has been treated so as to render it gas-tight. On the one hand the paper may have sufficient flexibility to enable it to bed down on to the contours of the vacuum package, and on the other hand may have sufficient rigidity to prevent a leak from being sealed under the influence of the pressure difference applied. The paper surface may be metallized for gas-tightness or be provided with a thin synthetic plastics layer.

In the case just mentioned, the functions of gastightness and limited flexibility of the wrapping foil are combined in one foil. Preferably, however, these functions are separated. In that case there are, for the wrapping foil:

a gas-tight outer foil preferably of great flexibility, and within the same, an inner foil, whose material need not be gastight, of limited flexibility, e.g. paper.

Naturally, pressure exchange between outer and inner foil should be possible. The inner foil may form part of the apparatus, in which case the inner foil is secured somehow to the outer foil (e.g. to the edge) and, if necessary, has perforations. The inner foil, however, may also be introduced together with the vacuum package, in particular in the case of packets of the bag-in-bag type. The paper wrapper applied about vacuum packages, as e.g. those of ground coffee, has been found satisfactory in this respect. Normally, this wrapper is applied about the vacuum package so that pressure exchange is possible between the space between the vacuum package and the wrapper and the space between wrapper and gas-tight wrapping foil, even when said pressure exchange does not take place through the paper. This is due to the fact that the wrapper is not adhered gas-tight about the vacuum package. If necessary, it can be ensured that the wrapper has some perforations.

This type of vacuum packages comprises a product-enveloping "inner sheet" of a gas-tight flexible synthetic plastics foil. This will exhibit an irregular "wrinkled" appearance during the drawing of a vacuum, which takes place during packing, in particular when a granulated product is concerned. About said vacuum package there is again applied an "outer sheet" (wrapper) which is formed snugly about the inner sheet. This wrapper is normally not gas-tight, non-elastic and flexible, but to a limited extent. Normally paper having a weight of approx. 8 $g/m^2$ is used for this purpose.

In applying overpressure to the exterior of the wrapping foil, the paper intermediate foil will be pressed against the vacuum package. Since this intermediate foil is non-elastic, however, and moreover of limited flexibility (i.e. having a certain "rigidity"), the above small irregularities of the surface of the vacuum package will not be entirely followed. This means that small communicating spaces will remain between the intermediate foil and the vacuum package. Free air circulation remains possible. Even in places where the intermediate foil directly touches the vacuum package, a leak present at that location will not be sealed. The space remaining between the wrapping foil and the intermediate foil can be minimized, since the wrapping foil has a substantial flexibility and preferably is also elastic.

The inner foil may also consist of a fabric, preferably of the type of fabric, such as textile, of sufficient coarseness to enable pressure exchange in longitudinal direction (e.g. nylon stocking). The gas-tight wrapping foil may also be lined itself on the inside with a fabric or fibre layer. The wrapping foil is preferably elastic. Highly suitable is rubber foil, such as used for condoms and weather balloons. Outer and inner foil (if any) preferably have the form of a bag of the same form as the vacuum package and with dimensions slightly larger than those of the vacuum package, including the tolerances.

The application of the pressure difference between outer and inner side of the wrapping foil can be effected in various manners. One method is that wherein the space between the foil and the package is brought to a subatmospheric pressure. Naturally, the pressure of the outside air will then ensure that the foil will be drawn into contact with the package. Since the pressure reduction during the gauging (detection period) per unit of time is larger as the pressure difference inside and outside the package is higher, the said subatmospheric pressure will be chosen sufficiently high so that the foil will properly bed down, on the other end not so low that the speed of pressure reduction becomes excessive. It has been found that a subatmospheric pressure between 800 mbar and 900 mbar is highly suitable for packing coffee with a wrapper. It has also been found that in that case the application of the pressure in two phases is particularly advantageous. Very good results have been obtained e.g. by first exhausting the space between the wrapping foil and the package until a pressure of 400 and 600 mbar is obtained, and to subsequently admit air again until a pressure of 800 to 900 mbar is reached, which takes place with the apparatus of FIG. 3.

Without wishing to be committed to a particular explanation, we note that it may be that during the application of a pressure difference, the adjustment of the foil to the surface of the package is a process which for some reason or other is not an instantaneous process. The space remaining between the foil and the package according to this explanation would change with the time during the detection period, i.e. become smaller, thereby hampering leak detection. Accordingly, this after-effect of the adjustment would be avoided by the said two-phase process. The two phases of the process can apparently be executed substantially immediately after one another.

In the above, use has been made of atmospheric pressure for the adjustment of the foil to the surface of the vacuum package. However, also super-atmospheric pressure may be employed therefor. In that case, the wrapping foil has to be received in a space wherein a superatmospheric pressure can be applied. When applying the superatmospheric pressure on the one side of the foil, the space between the foil and the package will be normally kept in open communication with the outside air. Superatmospheric pressures of between 100 and 200 mbar have been found suitable in the packing of coffee with wrapper in the apparatus of FIGS. 3a and 3b.

However, a two-phase method has been found to have appreciable advantages, too i.e. first applying superatmospheric pressure to the wrapping foil, and thereafter shutting off the gauging space from the outside air and bringing it to subatmospheric pressure. The gauging space is then again brought to atmospheric pressure and thereafter shut off from the outside air.

In a preferred embodiment of the invention, use is made of an elastic rubber bag wherein the vacuum package can be inserted. This bag will preferably have substantially the same form as the package and be slightly larger. This will be explained hereinafter with reference to FIG. 3. The most obvious mode is to use air pressure to cause the wrapping foil to adjust to the vacuum package. However, the use of a liquid is also possible. This has the advantage that after setting of the desired pressure and the hermetical sealing of the space containing the liquid, there is no "after-effect". The volume is then completely fixed.

In addition to the use of an external pressure medium, as proposed in the foregoing, it is also possible to effect the adjustment of the wrapping foil by the pressure that can be exerted on the foil by tension occurring in this foil when it is stretched by the insertion of the vacuum package. In that case, use can be made of an elastic bag-shaped foil which has the same general form as the vacuum package, but slightly smaller. Within the elastic wrapping foil of e.g. rubber, there may be provided an inner foil of e.g. elastic nylon fabric. The vacuum package should naturally have a suitable form for this embodiment.

It will be clear that in order to achieve maximum sensitivity, a proper choice has to be made between the various pressure gauges available. Naturally, a gauge will be selected whose internal air volume is minimal. A suitable type is e.g. one wherein a volume reduction occurs of 15 mm$^3$ at a pressure reduction of 100 mm H$_2$O, which corresponds to the measuring range of a suitable gauge. In the above, we have referred, throughout, to methods wherein leak detection takes place on one package at a time. Under certain circumstances, however, a number of packets can be subjected jointly to leak detection. The rational ground therefor is the following. In the existing situation e.g. coffee packages, bundled in groups of twenty-four, are removed from the packing line, then stored e.g. for 36 hours and mechanically "probed" for softness by feelers inserted through holes in the wrapping. Such a bundle of twenty-four packages can be received jointly in a wrapping foil and treated as explained hereinbefore. This procedure saves time. True, the detection time proper has to be extended, since the gauging space becomes larger, but the preparation phase, as regards time, can remain practically equal. Preparation phase means the phase wherein the bundles are brought within the wrapping foil and the subsequent operations take place until the moment when the gauging space is shut off from the outside air and the detection time proper commences.

Some embodiments of the invention will now be described, by way of example, with reference to the accompanying drawings, in which:

FIG. 1 diagrammatically shows an apparatus wherein a subatmospheric pressure is applied in the space between the package and the flexible wrapping foil, the latter being free in the outside air;

FIG. 2, likewise diagrammatically, shows an apparatus wherein the flexible wrapping foil itself is received in a rigid bell jar in which a superatmospheric pressure is applied;

FIG. 3b is a cross-section on the line III—III of FIG. 3a.

Figure 1:
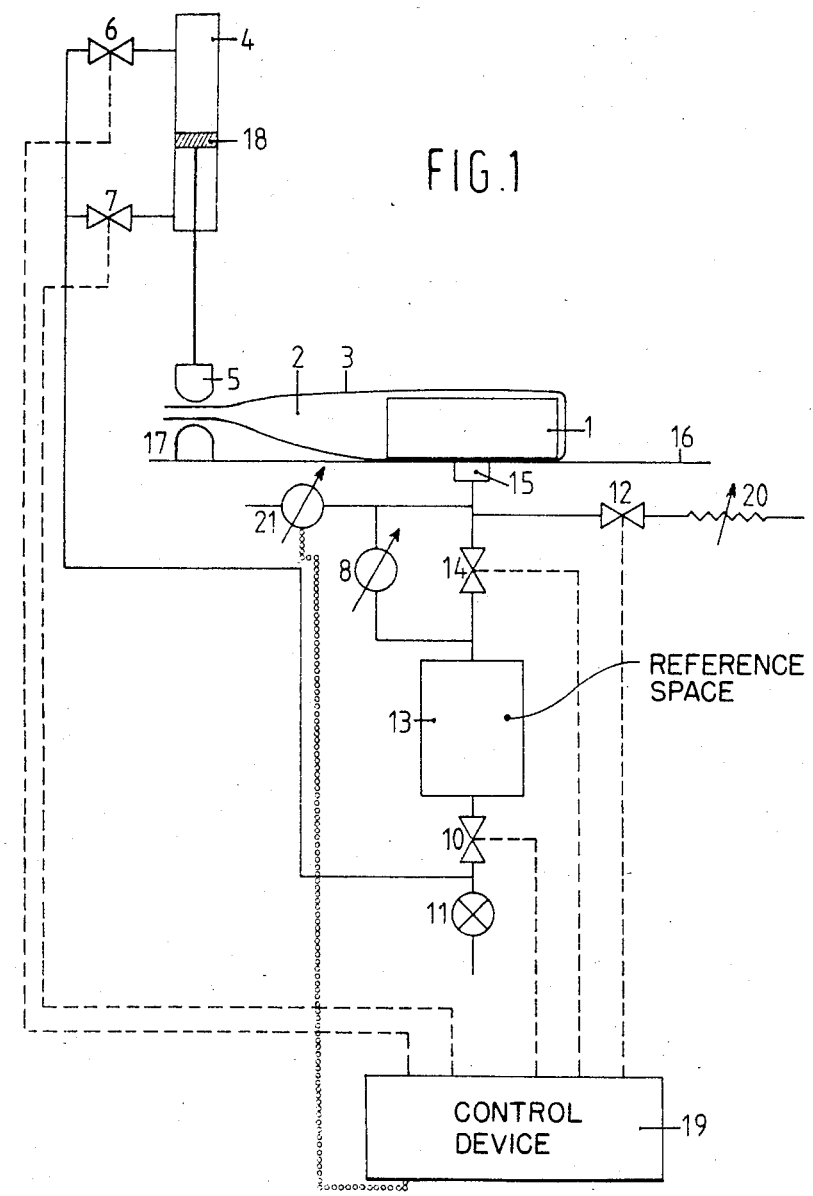
Figure 3A:
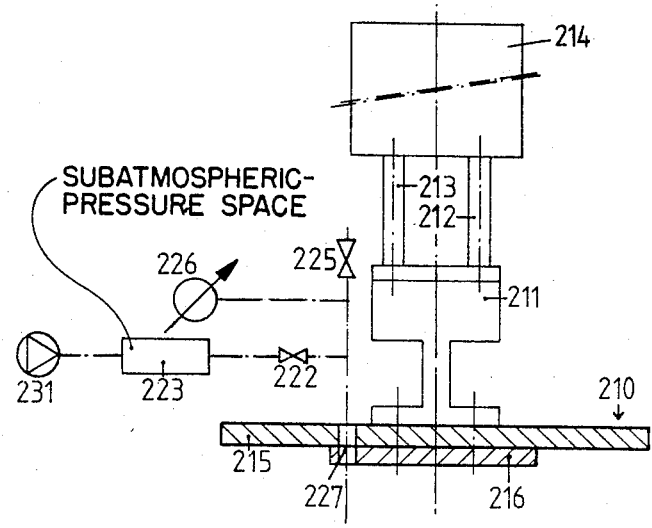
FIG. 3a shows a preferred embodiment according to the invention, partly in longitudinal section, partly in side view.
Figure 3C:
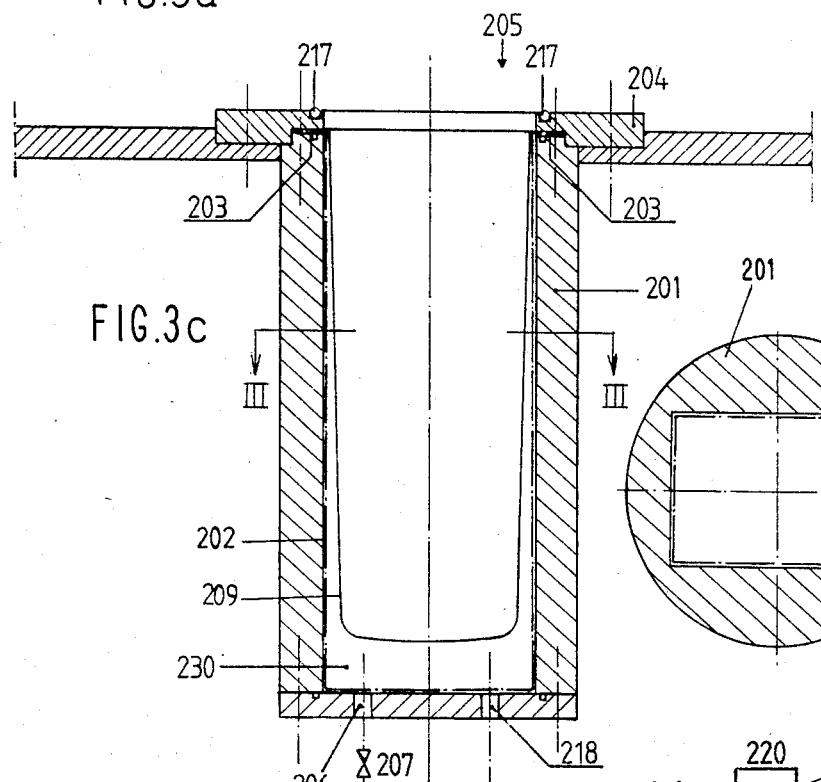

In FIGS. 1, 3 illustrates a bag-shaped flexible wrapping foil receiving the package 1. In the wall of the bag-shaped flexible wrapping foil 3 there is provided a rigid fitting 15. The wrapping foil with package lies on a table 16. The interior of the wrapping foil is connected through fitting 15 and the electrically operable valve 14 to space 13. Wrapping foil 3, at its opening end, lies on a beam 17. Hermetical sealing is effected by lowering the beam 5. Beam 5 is activated by the air cylinder 4, whose piston 18 is adapted for upward or downward movement by means of air pressure control via valves 6 and 7. At the start of the gauging operation, vacuum pump 11 is started by a control signal from an electrically programmed control device 19. The same control device 19 opens at the same time valve 10 and valve 14. Through the action of pump 11, air is sucked away from gauging space 2 of the wrapping foil, so that the flexible foil adjusts to the contours of the package. "Redundant" flexible material forms pleats.

The pumping action by the vacuum pump continues until the volume of the gauging space practically does not change any longer. Valve 14 is now closed by means of control device 19. According to experience, this can be correlated in each particular case to the pressure. This pressure (to be referred to hereinafter as "initial pressure") may be 80 mbar and is gauged by the pressure gauge 21. Pumping may be discontinued now, but if one wishes to obtain more certainty that the adjustment of the material to the package is constant and shows no after-effect, then the pressure may be further reduced (e.g. to 400 mbar) and subsequently be increased again to the above mentioned pressure of 800 mbar by means of valve 12, which permits air intake via resistor 20. In fact it is favourable for sensitive gauging when the pressure difference between the gauging space and the interior of the package is relatively large. The differential pressure gauge 8, after closure of the valve 14, gauges the pressure differential between the gauging space 2 and the reference space 13. In case the package is entirely free from leaks, the pressure differential between the gauging space and the reference space remains zero. If the packet shows any leak, air will flow from the gauging space into the package, thus producing a pressure reduction in the gauging space 2, which is gauged by the differential pressure gauge 8 connected ro the electrically programmed control device 19. When the pressure reduction exceeds a very small predetermined, adjustable value, it is assumed that there is a leak. The magnitude of the leak determines the rate of the pressure reduction in the gauging space, i.e. by gauging the rate of pressure reduction or even visually detecting the same, it is possible to get an impression of the magnitude of the leak. The great sensitivity of the method according to the invention is due to the fact that the free space in the package (i.e. the space between the packaged particles) is very large relatively to the gauging space 2 created in the above described manner. If that ratio is e.g. 1:100, then the pressure reduction per second in the gauging space is 100 times larger than the pressure increase per second in the free space within the package.

Figure 2:
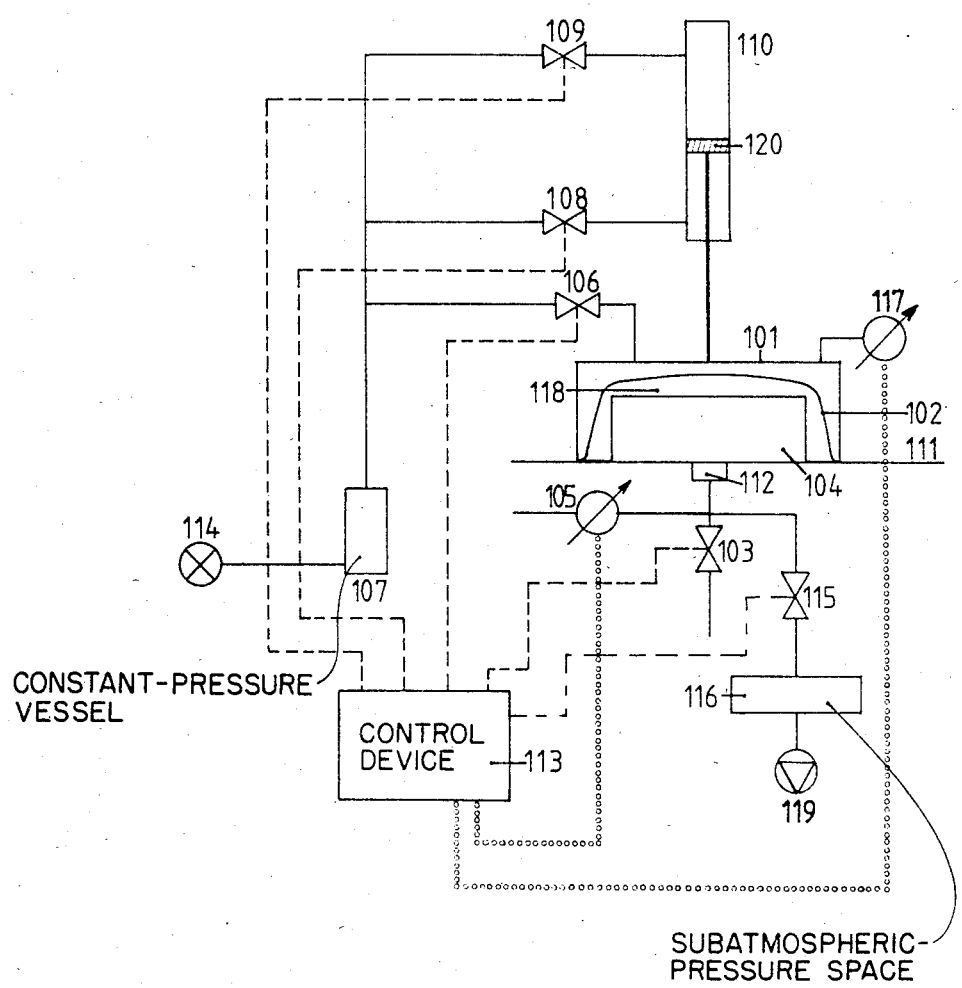

In FIG. 2 a wrapping foil 102 is applied within a rigid bell jar 101. Bell jar 101 can be pressed against the table 111 by means of cylinder 110, whereby the rim of the bell jar is hermetically sealed into contact with the table.

Gauging space 118 within the wrapping foil is connected through an opening 112 to the electrically operable valve 103 and differential pressure gauge 105, which is connected on one side to the outside air. With a view to an optimally sensitive operation, preferably the connection to 105 should provide a minimal contribution to the volume remaining between the wrapping foil and the package. Valve 103 is opened, after which, via valve 106 and the constant-pressure vessel 107, operated by pump 114, pressure is exerted on wrapping foil 102. Via valve 103 the air escapes from the wrapping foil and its material adjusts to the package. The gauging space is formed by the space remaining between the inner surface of the material of the wrapping foil and the outer surface of the package plus the space remaining between the underside of package 104 and the surface of table 111 and the space in the connection to valve 103 and differential pressure gauge 105.

First, an overpressure of approx. 200 mbar is applied to wrapping foil 102, then gauging space 118 is shut off from the outside air by closure of valve 103 and by opening valve 115 is connected to subatmospheric pressure space 116, which is maintained at subatmospheric pressure by vacuum pump 119. Gauging space 118 can then immediately be brought to atmospheric pressure by closing valve 115 and opening valve 103. Immediately afterwards, valve 103 is closed again, after which gauging may take place. The absolute-pressure gauge 117 serves for detecting the superatmospheric pressure on the wrapping foil. Valves 103, 106 and 115, as well as valves 108 and 109, for the supply and discharge of pressure to and from air cylinder 110, are operated by the electrically programmed control device 113. Pressure gauges 105 and 117 provide an electric feedback to said control device 113.

Figure 3B:
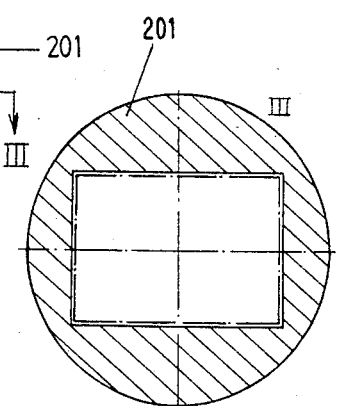

FIGS. 3a and 3b show an embodiment based on the principles already described in FIG. 2. At 201 is shown the rigid bell jar accommodating a wrapping foil 202 of thin rubber having the form of a suspending bag, preformed and of rectangular cross-section. Said bag is fitted with a flange which is clamped at 203 between the wall of the bell jar and a plate 204 linking up with said wall and having a rectangular opening 205 for the passage of the package. For the purpose of gauging, subatmospheric pressure is applied through opening 206 via the valve 207 to the space between the bell jar and the bag by pump 208, so that the flexible bag is sucked against the inner wall of the bell jar. The package, in cross-section, having approximately the same contours as the preformed flexible bag in normal condition, can now easily be inserted into said bag. This will then come to rest in the first place on a thin piece of elastic 209 disposed in the bag and also clamped at 203. In this manner, the packet slightly projects above the surface of the plate 204.

Cover 210 is connected, by means of an attachment device 211, to two rods 212,213 guided in an air pressure cylinder 214. Said cover 210 can be moved downwardly by compressed air in the air pressure cylinder. The cover 210 comprises two parts, i.e. a disc 215, on which there is mounted a rectangular plate 216. In lowering cover 210, the package is pushed further into the bag. Plate 215 comes to press on the elastic O-ring 217, thereby effecting a hermetic seal. The rectangular plate 216 comes to lie in the rectangular opening 205 of plate 204. There now remains only a small space between the bottom of the package and the bottom of the bag.

The valve 207 is closed now and air is admitted through opening 218 into the space between the bell jar and the flexible bag 202. This is effected by opening valve 219, so that the above space is connected to the pressure vessel 220, operated by pump 221. As a result, bag 202 is pressed tightly against the package present in said bag. The overpressure will e.g. be 200 mbar and is gauged by pressure gauge 224. When the flexible bag 202 has properly adjusted to the contours of the package, the measuring space 230 is shut off by the valve 225 from the outside air and by opening valve 22, is connected to the subatmospheric-pressure space 223, which is maintained at subatmospheric pressure by the vacuum pump 231. Gauging space 230 can then be brought immediately back to atmospheric pressure by closing valve 222 and opening valve 225. After waiting a few seconds, for setting the equilibrium, valve 225 is closed again, after which gauging can take place.

After the detection period, valve 225 and valve 207 are opened again and cover 210 is lifted by the air pressure cylinder 214. Then pump 208 is set in operation, so that subatmospheric pressure is produced in the space between the bell jar and the flexible bag and the latter is "sucked" against the inside of the former. The piece of elastic 209 ensures that the package is lifted and can be removed from the bag. In a manner corresponding to that discussed with reference to FIG. 2, the valves in the embodiment shown in FIGS. 3a and 3b are operated by an electric control device to which the pressure gauges provide a feedback. Said control device is not shown in FIG. 3. It has been found that it is possible, by means of the apparatus and method described with reference to FIGS. 3a and 3b, to easily detect a leak in 250 gram vacuum packages containing ground coffee within 6 seconds, such leak being so small that the package will not be qualified as "soft" even after 24 hours.

EXAMPLE

To check the reliability of the method according to the invention, 3,400 vacuum packages containing coffee (each of 250 grams) originating from different packaging lines were tested with the apparatus shown in FIGS. 3a 3b. For the sake of comparison, all these packages were manually tested for becoming soft. This was found in one package only, which had not been found leaky by the apparatus. Of these 3,400 packages, 35 were indicated as leaky. The period of time between the detection of the leak according to the present method and the detection thereof by manual inspection (softening) and the numbers to which this applied, are indicated in the following Table.

| | |
|---|---|
| 0–¼ hour | 9 packages |
| ¼–1 hour | 7 packages |
| 1–8 hours | 8 packages |
| 8–14 hours | 4 packages |
| 14–17 hours | 2 packages |
| 17–21 hours | 1 package |
| 21–31 hours | 1 package |
| 31–96 hours | 2 packages |
| 96–336 hours | 1 package |
| | 35 packages |

What I claim is:

1. A method for detecting a leak in a vacuum package comprising the steps of:
    receiving said vacuum package within a wrapping means, comprising at least a gastight, flexible foil adapted for substantial adjustment to the contours of the vacuum package under the influence of over-pressure applied to the outside of said foil, without sealing off any leak present in said vacuum package;
    applying over-pressure to said outside of said foil, while ensuring that the pressure in the residual space between said vacuum package and the inside of said foil is higher than the pressure within said vacuum package; and
    registering the pressure in said residual space for a predetermined detection period while hermetically sealing the outside air from said residual space, so as to detect a drop in said pressure which is indicative of the presence of a leak.

2. A method according to claim 1, characterized in that within the wrapping foil there is provided an intermediate layer having such properties that is contributes to preventing the sealing of any leak present.

3. A method according to claim 2, characterized in that the intermediate layer has a paper-like structure.

4. A method according to claim 2, characterized in that the intermediate layer has the structure of a fabric.

5. A method according to claim 4, applied to a vacuum tin package.

6. A method according to claim 1, characterized in that said foil is elastic.

7. A method according to claim 1, applied to a vacuum package with paper wrapping, characterized in that the adjustment of said foil to the contours of the vacuum package is effected by application of superatmospheric pressure on the outside of said foil before as well as after the sealing of the residual space from the outside air, and during the detection period.

8. A method according to claim 7, characterized in that the application of superatmospheric pressure to the wrapping foil is effected in two phases, a first phase with a relatively high superatmospheric pressure and a second phase with a relatively low superatmospheric pressure.

9. A method according to claim 1, applied to a vacuum package with paper wrapping characterized in that the adjustment of said foil to the contours of the vacuum package is effected by applying subatmospheric pressure in said residual space after sealing of the residual space and during said detection period, while maintaining atmospheric pressure on the outside of said foil.

10. An apparatus for detecting a leak in a vacuum package, comprising:
    wrapping means for receiving and tightly wrapping the said vacuum package, said wrapping means consisting at least essentially of a wrapping foil or sheet of flexible, gas-tight material,
    means for forcibly pressing said wrapping foil against said vacuum package when the vacuum package has been applied in said wrapping means,
    means for detecting a pressure drop in the remaining residual space between the said vacuum package and the said wrapping means after forcibly pressing the said sheet of material against the vacuum package,
    means for hermetically sealing the said residual space from the atmosphere.

11. An apparatus according to claim 10, characterized in that the said wrapping sheet or foil has elastic properties.

12. An apparatus according to claim 10 or 11, comprising an intermediate layer between the said vacuum package and the said wrapping sheet or foil, the said intermediate layer being incapable of sealing the said leak in the vacuum package when pressure is exerted against the vacuum package.

13. An apparatus according to claim 12, additionally comprising means for producing a subatmospheric pressure in the space between the said pressure-resistant box and the said bag.

14. An apparatus according to claim 10, characterized in that the said pressure means comprise means for applying a fluid pressure to the outer surface of the said wrapping foil or sheet.

15. An apparatus according to claim 14, characterized in that the said wrapping foil comprises an elastic bag for receiving the said vacuum package, characterized in that the apparatus comprises:
    means for maintaining the said bag in operation, in an upright position, with the opening of the said bag being sufficiently large to enable insertion of a vacuum package,
    pressure-resistant means enveloping the said bag on all sides, except for the open side, said means forming a pressure-resistant box, bell jar or the like, open at the top and adjacent the edge hermetically connected to the rim of the said bag,
    means for connecting the space between the said bag and the said pressure-resistant means to the means for supplying fluid pressure to the outer surface of the said bag,
    means for hermetically sealing the said bag after insertion of the said vacuum package, fitted with a cover, integral with the said detection means, said cover being adapted for coaction with the rim of the pressure-resistant box.

16. An apparatus according to claim 10, characterized in that the said pressure means comprise means for producing a subatmospheric pressure in the said residual space.

* * * * *